United States Patent

Stolper et al.

[11] Patent Number: 4,629,254
[45] Date of Patent: Dec. 16, 1986

[54] MOTOR VEHICLE SEAT

[75] Inventors: Richard Stolper, Ginsheim-Gustavsburg; Theo Adler, Bensheim; Lütz Küssmann, Trebur, all of Fed. Rep. of Germany

[73] Assignee: General Motors Corporation, Detroit, Mich.

[21] Appl. No.: 720,079

[22] Filed: Apr. 4, 1985

[30] Foreign Application Priority Data

Apr. 18, 1984 [DE] Fed. Rep. of Germany ....... 3414649

[51] Int. Cl.[4] .............................................. B60N 1/08
[52] U.S. Cl. .................................... 297/473; 248/430; 297/344; 297/468
[58] Field of Search ............... 297/468, 473, 216, 344, 297/346; 248/393, 429, 430

[56] References Cited

U.S. PATENT DOCUMENTS

| 4,072,347 | 2/1978 | Boisset | 248/429 X |
| 4,248,480 | 2/1981 | Koucky et al. | 297/216 X |
| 4,262,963 | 4/1981 | Bauer et al. | 248/429 X |
| 4,526,424 | 7/1985 | Korth | 297/473 |

FOREIGN PATENT DOCUMENTS

| 2254557 | 5/1974 | Fed. Rep. of Germany | 248/393 |
| 2364797 | 7/1974 | Fed. Rep. of Germany | 248/393 |
| 2400898 | 7/1975 | Fed. Rep. of Germany | |
| 3226932 | 1/1984 | Fed. Rep. of Germany | 297/473 |
| 2013771 | 8/1979 | United Kingdom | 248/430 |

Primary Examiner—Francis K. Zugel
Assistant Examiner—Peter R. Brown
Attorney, Agent, or Firm—Charles E. Leahy

[57] ABSTRACT

A motor vehicle seat has a pair of upper track members attached thereto which serve to guide the seat for sliding movement in a pair of stationary lower track members. On that upper track member on which the belt lock is located, a shackle secured to the upper track member is completely embracing the lower track member.

A pawl, which is attached on the shackle, is adapted to extend through apertures in the shackle and engage with apertures provided in the lower track member. This arrangement will, on the one hand, enable the belt lock to be directly coupled with the lower track member and, on the other hand, permit the shackle through its pawl to lock the motor vehicle seat on the lower track member in selected positions.

4 Claims, 6 Drawing Figures

MOTOR VEHICLE SEAT

The invention relates to a motor vehicle seat having attached thereto a pair of upper track members adapted to guide the seat for sliding movement in stationary lower track members, and including releasable latching means for locking the seat on the lower track member in selected positions, said latching means having attached thereto a shackle for accommodating a seat belt lock, with the shackle being arranged so as to completely embrace one of the lower track members.

BACKGROUND OF THE INVENTION

When employing seats of this type it is desirable that the belt forces incidental to the occurrence of an occupant restraining load be directed, as far as is possible, directly into the vehicle substructure. However, in the case of motor vehicle seats adapted for longitudinal adjustment. It is desirable that the shackles accommodating the belt locks be mounted so as to permit movement in unison with the seat.

In accordance with the German Offenlegungsschrift DE-OS No. 24 00 898, the shackle accommodating a belt lock is arranged so as to completely embrace the lower track. The lower track is provided with toothing to enable a catch of the shackle to engage therein if, as the result of an accident, the shackle has been deformed by the tensile forces acting on the belt. This arrangement will provide that the shackle is coupled with the lower track. The arrangement is such that, during normal seat adjusting movement, the catch is prevented from engagement with the toothing, so that the shackle will not interfere with the fore and aft adjusting movement.

The motor vehicle seats described in DE-OS No. 20 27 884 and DE-OS No. 28 26 634 are functioning in substantially the same fashion. The operation in all these prior art vehicle seats is such that the components provided for accommodating the belt lock will not interfere with the longitudinal seat adjustment movement, but that at the instant of an occupant restraint load on the belt, a solid connection will be established between the seat belt lock and the lower track member.

One disadvantage inherent in these prior art vehicle seats is that catch means must be provided on the lower track over the entire seat adjusting range for the shackle accommodating the belt lock, as well as for the seat position locking device, and that two locking mechanisms are needed, i.e., one which will be operatively effective during normal longitudinal seat adjusting movement, and another one which in the event of an occupant restraint load on the belt, is adapted to lock the shackle accommodating the belt lock to the lower track.

It is the object of the present invention to incorporate means in a motor vehicle seat of the type described above which, while employing only one single latching mechanism and using a minimum amount of material, enable the seat to be fixed into selective longitudinal positions, and the shackle accommodating the seat belt buckle to be locked into position.

SUMMARY OF THE INVENTION

This object is accomplished in accordance with the invention in that on the shackle there is provided a pawl member which acts as the seat locking means, and that the pawl member is adapted to be moved, by means of a lever, out of disengagement from notch-forming apertures provided in the lower track member.

In an arrangement of this type, the shackle accommodating the belt lock will always be locked to the lower track member, unless the seat adjusting mechanism is actuated. As a result, the motor vehicle seat, too, is locked longitudinally to the lower track member. By virtue of the means proposed in the present invention, only one single latching mechanism is required to effect both locking operations. Thus, without compromising any of the existing advantages, the novel arrangement is relatively simple in design as compared to the prior art arrangements. In the seat according to the invention, the shackle accommodating the belt lock is locked to the lower track member even under normal operating conditions.

In one advantageous arrangement according to the invention, the lower track member is comprised of a box section that is open at the top and is provided with a downwardly directed flange. By virtue of the flange, the section modulus of the lower track member is, with a minimum expenditure in material, increased to a considerable degree, especially in the direction in which the principal forces, initiated by the seat belt upon the occurrence of an accident, are acting.

In order to ensure that the seat is properly locked onto the lower track member in the selected position, and that the shackle accommodating the belt lock is reliably coupled to the lower rail, it is proposed that the catch means be in the form of apertures which are arranged, one behind the other, in the flange of the lower track member, and that the shackle be provided on either side of the lower track member with corresponding apertures through which the pawl member will engage when the seat is in its locked position. In the event that a load is imposed, the pawl will be subjected to a shear load. This arrangement will provide that a force of great magnitude can be controlled with a minimum expenditure of material.

The cross section of the pawl for effecting latching may be relatively large without the need for relatively large steps in the seat adjustment positions. This is accomplished in that the pawl member is provided with a pair of pawl arms which are arranged adjacent to one another in the lengthwise direction of the lower track member. The pawl arms are adapted for engagement with a pair of adjacent apertures formed in the flange of the lower track member. In order to enable rapid engagement of the shackle with the lower track member in the event of a collision, it is proposed that the cross-sectional shape conform closely to that of the lower track member, so that the lower track member is not required to absorb high acceleration forces.

A simple arrangement in which the pawl is pivotally retained on the shackle is one wherein a bracket is disposed in the vicinity of the shackle for journaling one end of a release bar, and wherein the release bar, which is extending parallel to the lower track member, serves as a support means for the pawl.

The arrangement may be such that the maximum length of the displacement path of the upper track member is determined by the shackle disposed intermediate the anchoring points of the lower track member. This arrangement will provide that, in terms of force distribution, there will initially be one carrier on two support members, so that there will not be encountered any unduly high forces as a result of torque acting on long lever arms.

Naturally, a motor vehicle seat will be retained more securely on the lower track members if a pawl is provided on each of the lower track members for latching engagement therewith. However, it is desirable to assume that, if engagement is effected only on one of the lower track members, such enlargement will not be obtained only on that track member which had not been conceptualized as the belt force absorbing means. This can be assured if, in accordance with the present invention, there is provided on the track member disposed opposite the shackle accommodating the belt lock a pawl which is trailingly coupled with the pawl retained on the shackle. This trailing pawl arrangement is to ensure that engagement of the pawl on the side of the shackle will always take place prior to the engagement of the other pawl, so that in all instances locking is effected at least on the side on which the shackle accommodating the belt lock is disposed.

Inasmuch as the forces incidental to an accident are not very high on the track member disposed opposite the belt lock, there is no need to provide on this side a shackle which is completely embracing that lower track. Instead, it is sufficient that the pawl on the track member disposed opposite of the belt lock be arranged on a support member which embraces the lower track member from one side only.

BRIEF DESCRIPTION OF THE DRAWINGS

The invention permits a variety of embodiments. For a better understanding of the principal concept of the invention, one exemplary embodiment is described in the following specifications and illustrated in the accompanying drawings, wherein.

DESCRIPTION OF THE PREFERRED EMBODIMENT

Figure 1:
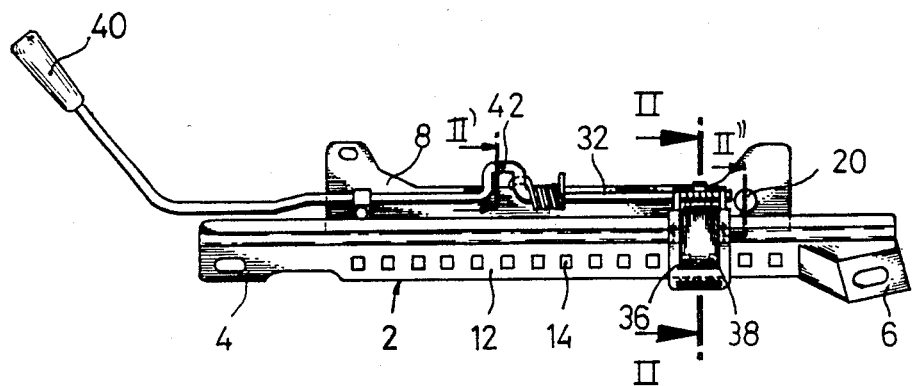
FIG. 1 is a side elevation of a guide rail arrangement of a vehicular seat according to the invention, with the guide rail being disposed midway of the vehicle.

FIG. 1 illustrates a lower track member 2 having mounting ends 4, 6 by which the same is bolted, in a manner not shown in the drawing, to the substructure of the motor vehicle. An upper guide member 8, which is to be fixedly attached to the lower seat frame, is guided for longitudinal movement in the lower frame 2.

Figure 2:
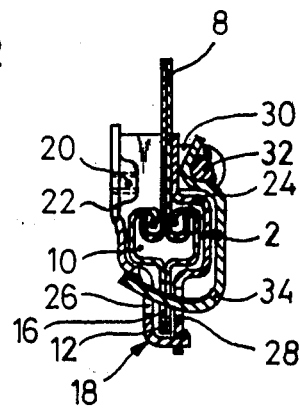
FIG. 2 is a sectional view of the arrangement according to FIG. 1 taken on line II—II.

As is apparent, especially from FIG. 2, the lower track member is comprised of an upwardly open section 10 and a downwardly directed flange 12. The flange 12 is provided with rectangular apertures, two of them being designated, for exemplary purposes, by the numerals 14, 16, respectively. The lower track member 2 is embraced by a shackle 18 whose shape conforms to that of the lower track member 2 and which is spaced at a close distance therefrom. The shackle 18 has at its upper end a belt lock mounting means 20 to which an ordinary seat belt lock is attachable. It is apparent, especially from FIG. 2, that the shackle 18 is comprised of two halves 22, 24. The shackle halves 22, 24 are welded to the upper track member 8, are embracing the lower track member 2 at a close distance therefrom, and are joined to one another by welding below the flange 12. In the portion adjacent the flange 12 the shackle halves 22, 24 are provided with apertures 26, 28 that are spaced apart from one another at the same distance as the apertures 14, 16 in flange 12.

A bearing block 30 is attached to the upper rail 8, and a release bar 32, which is extending parallel to the upper track member 8, has one of its ends journaled in said bearing block. A pawl 34 is attached to this release bar 32 by welding in the region of the shackle 18. The pawl 34 includes two pawl arms 36, 38 which, in the latched state, are extending through the apertures 26, 28 of the shackle 18 and through two adjacent apertures 14, 16 of the flange 12 of the lower track member 2. This pawl constitutes the locking means for the motor vehicle seat.

A handle 40 disposed at the forward end of the release bar 32 serves as a means for unlatching the pawl 34. When the handle 40 is turned counterclockwise, the pawl 34 will be pivoted and will be withdrawn from the apertures 14, 16, which will enable the seats to be moved fore and aft. When the handle 40 is released again, the pawl 34 will be caused to engage, in accordance with the newly selected seating position, into corresponding apertures provided in the flange 12 of the lower track member 2.

Figure 3:
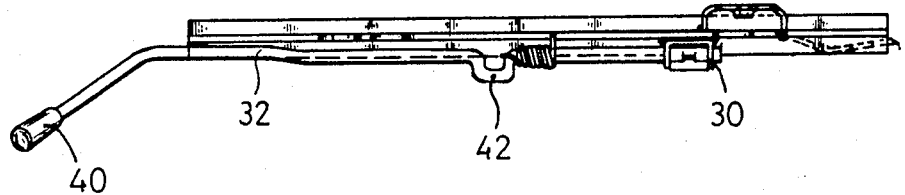
FIG. 3 is a plan view of the arrangement of FIG. 1.
Figure 4:
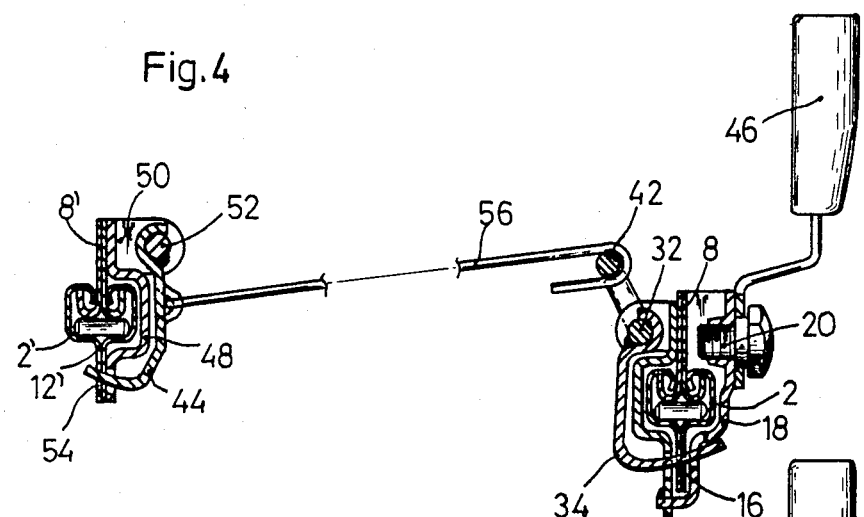
FIG. 4 is a sectional view of the arrangement according to FIG. 1 on line II—II, including sections along line II' and II" that have been moved into the same plane and with the belt lock being mounted in position.
Figure 5:
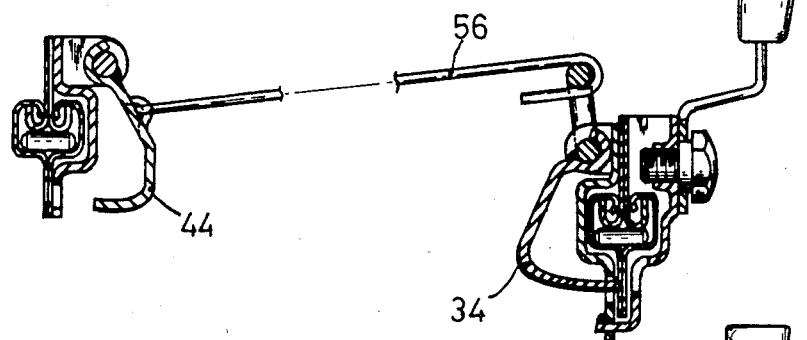
FIG. 5 is the arrangement according to FIG. 3 in the unlatched state.

It is also apparent from FIG. 2 and FIG. 3 that the release bar 32 is provided with a bowed or U-shaped portion 42 which serves as a means to actuate a second pawl 44, which will be described in the following by way of FIGS. 4 to 6. On the left side of FIG. 4, one will notice the previously mentioned shackle 18 which is embracing the lower track member 2 and which cooperates with the pawl 34. One will also notice the release bar 32 with the bowed portion 42. Furthermore, FIG. 4 illustrates a belt lock 46 which is attached to the shackle.

As is typical in motor vehicle seats, a further lower track member 2', in which an upper track member 8' connected to the seat is guided, is arranged parallel to the lower track member 2. A support member 48 is attached to this upper track member 8' so as to embrace the lower track member 2' from one side, and a bearing support member 50, which is supporting the pawl 44 by means of a shaft 52, is welded to said support member 48. Just like the pawl 34, pawl 44 is adapted for engagement with apertures 54 of the flange 12' of the lower track member 2' and is thereby caused to lock the seat to the lower track member 2'. When the pawl 44 is in the locked position, as illustrated in FIG. 4, it is kept under the biasing force of a spring (not shown in the drawings). Unlatching is accomplished through a wire pull means 56 which has one of its ends attached to the pawl 44 and the other end to the bow-shaped portion 42 of the release bar 32.

Upon turning the release bar in clockwise direction, both pawls 34 and 44 are pivoted out of the apertures 16 and 54, respectively. The linkage arrangement is such that the pawl 44 will be caused to unlatch earlier than the pawl 34. The unlatched position of both pawls are illustrated in FIG. 5.

Figure 6:
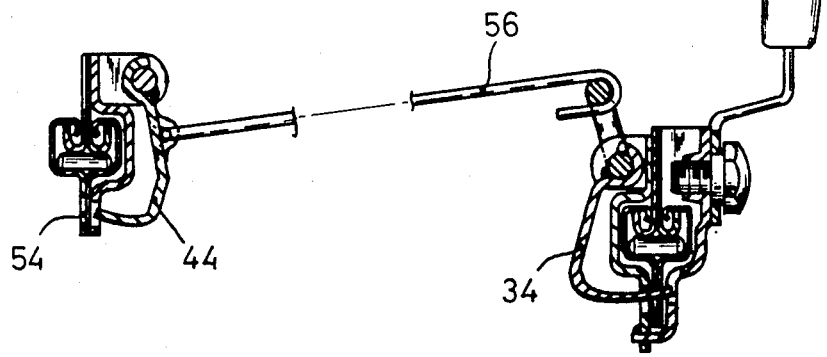
FIG. 6 is the arrangement according to FIG. 4 in a partially latched state.

When changing from the unlatched position to the latched position, initially only the pawl 34 will be moved into its latching position, as illustrated in FIG. 6. Subsequently, the pawl 44, too, will move into the aperture 54. This arrangement will ensure that in any event a locking position is established on the side on which the belt lock is located.

The embodiments of the invention in which an exclusive property or privilege is claimed are defined as follows:

1. A vehicle seat adjuster adapted for mounting a seat belt on the seat for longitudinal fore and aft adjustment in unison with the seat comprising:
   a lower track having mounting ends adapted for mounting on the vehicle floor and a central rectilinear extending track portion having a plurality of apertures spaced equidistant therealong;
   an upper track adapted for mounting on the seat;
   slide means acting between the upper and lower tracks;
   a shackle having inboard and outboard halves suitably attached as by welding to the upper track on opposite inboard and outboard sides thereof, said shackle halves extending downwardly to embrace the lower track in closely spaced relation and being suitably attached to one another beneath the lower track as by welding, said shackle halves each having at least one aperture registering with each other and registering with the apertures of the lower track upon longitudinal fore and aft adjustment of the seat,
   means mounting the seat belt on the outboard shackle halve;
   and latch means pivotally mounted on the inboard shackle halve and having a pawl, said pawl being pivotable between a latched position in which the pawl extends through the apertures of both the shackle halves and the apertures of the lower track to latch the seat at a selected fore and aft position and to latch the seat belt mounting outboard shackle to the lower track, and an unlatched position in which the seat position and seat belt position is fore and aft adjustable along the lower track.

2. The vehicle seat adjuster of claim 1 characterized by the attachment of the shackle halves to one another beneath the lower track limits the longitudinal fore and aft adjustment of the seat by engaging with the mounting ends of the lower track mounting the lower track on the vehicle floor.

3. A vehicle seat adjuster assembly having inboard and outboard track assemblies adapted for mounting a seat for longitudinal fore and aft adjustment and adapted to mount a seat belt on the seat for fore and aft adjustment in unison with the seat comprising:
   each of said inboard and outboard track assemblies including a lower track having mounting ends adapted for mounting on the vehicle floor and a central rectilinear extending track portion having a plurality of apertures spaced equidistant therealong, an upper track adapted for mounting on the seat, and slide means acting between the upper and lower tracks;
   a shackle having inboard and outboard halves suitably attached as by welding to the upper track of one of the inboard and outboard track assemblies on opposite inborad and outboard sides thereof, said shackle halves extending downwardly to embrace the lower track in closely spaced relation and being suitably attached to one another beneath the lower track as by welding, said shackle halves each having at least one aperture registering with each other end registering with the apertures of the lower track upon longitudinal fore and aft adjustment of the seat,
   means mounting the seat belt on the outboard shackle halve;
   a first latch means pivotally mounted on the inboard shackle halve and having a pawl, said pawl being pivotable between a latched position in which the pawl extends through the apertures of the shackle halves and the apertures of the lower track to latch the seat at a selected fore and aft position and to latch the seat belt mounting outboard shackle to the lower track, and an unlatched position in which the seat position and seat belt position is fore and aft adjustable along the lower track;
   a second latch means pivotally associated with the upper track of the other of the inboard and outboard track assemblies and having a pawl pivotable between latched and unlatched positions with respect to the lower track,
   and means operably connecting the first and second latch means.

4. The vehicle seat adjuster according to claim 1 characterized by the means connecting the first and second latch means providing a sequential time-lag relationship between the operation of the first and second latch means so that one latch is latched before the other.

* * * * *